(12) United States Patent
LePage

(10) Patent No.: US 6,766,880 B2
(45) Date of Patent: Jul. 27, 2004

(54) PORTABLE ELEVATED OBSERVATION APPARATUS

(76) Inventor: Dean LePage, c/o 520 - 1801 Hamilton Street, Regina SK (CA), S4P 4B4

( * ) Notice: Subject to any disclaimer, the term of this patent is extended or adjusted under 35 U.S.C. 154(b) by 0 days.

(21) Appl. No.: 10/214,675

(22) Filed: Aug. 8, 2002

(65) Prior Publication Data

US 2004/0026169 A1 Feb. 12, 2004

(51) Int. Cl.[7] ............................................. A01M 31/00
(52) U.S. Cl. ......................... 182/116; 182/196; 182/121
(58) Field of Search ......................... 182/116, 196–199, 182/150, 187, 120–122

(56) References Cited

U.S. PATENT DOCUMENTS

| | | | | |
|---|---|---|---|---|
| 281,154 A | * | 7/1883 | Solomons | 182/50 |
| 330,705 A | * | 11/1885 | Hook | 297/279 |
| 636,669 A | * | 11/1899 | Jesseman | 297/279 |
| 806,597 A | * | 12/1905 | Stoker | 182/93 |
| 3,700,278 A | * | 10/1972 | Gulba | 297/188.07 |
| 4,553,635 A | * | 11/1985 | Johnson | 182/187 |
| 5,704,669 A | * | 1/1998 | Clark | 294/19.1 |

* cited by examiner

*Primary Examiner*—Alvin Chin-Shue
(74) *Attorney, Agent, or Firm*—Patterson, Thuente, Skaar & Christensen, P.A.

(57) ABSTRACT

A portable elevated observation chair apparatus comprises a rope ladder releasably attached on each side of a top end thereof to laterally separated elevated support locations and releasably attached on each side of a bottom portion to laterally separated bottom support locations. The attachments cause the rope ladder to resist twisting away from the forward facing direction. A bottom end of the rope ladder is located forward of the top end thereof such that lower rungs of the rope ladder are forward of higher rungs. A flexible chair is attached between upper and lower adjacent rungs located in proximity to the top end of the rope such that a seat is provided by the flexible chair between the rungs. Conveniently the support locations are provided by trees, and the apparatus may be rolled up in a compact bundle and readily carried through treed areas.

19 Claims, 2 Drawing Sheets

PORTABLE ELEVATED OBSERVATION APPARATUS

This invention is in the field of portable observation apparatuses and in particular an observation apparatus that can be converted from an upright hanging position into a compact rolled transport configuration.

BACKGROUND

Elevated platforms are useful for hunters, photographers, and observers of wildlife who seek to disguise themselves or limit the possibility of being noticed by wild animals. Elevation allows such persons to maintain a proximate position with respect to the wild animals while at the same time decreasing the possibility of frightening or scaring off the animals.

It is known to teach a free-standing elevated platform that is supported by a plurality of legs. Such platforms are disclosed for example in U.S. Pat. No. 5,862,827 to Howze, U.S. Pat. No. 5,485,978, to Hernandez, and U.S. Pat. No. 6,186,271 to Borries and Scarborough and Canadian Patent Number 1,266,698 to Roy.

It is also known to lean the observation apparatus against a tree or other substantial vertical support for it to become functional. Such platforms are disclosed in Canadian patent No. 1,231,686, to Purdy, Canadian patent No. 2,342,127 to Andrey, Canadian patent No. 1,122,180 to Stavenau, U.S. Pat. No. 5,016,732 to Dunn.

In order to be free-standing or leaned against a tree or other substantial vertical support such apparatuses must be constructed out of rigid parts made of metal or wood, making them heavy and awkward to carry when walking considerable distances, especially though treed areas.

Observation apparatuses have been designed to be transported by a powered vehicle. Such patents are disclosed in U.S. Pat. No. 5,105,908 to Freund, U.S. Pat. No. 5,314,042 to Adams, U.S. Pat. No. 5,566,780 to Bambrough, U.S. Pat. No. 5,839,538 to Magyar, U.S. Pat. No. 5,295,555 to Strange, U.S. Pat. No. 5,564,523 to Howard. The user is limited only to locations accessible to such vehicles. The use of motorized vehicles may frighten wild animals from the area.

The prior art apparatuses contain numerous many component parts which require some time to erect. Often the components must slide or pivot, giving rise to a considerable number of hinges and other parts that are subject to wear and failure.

SUMMARY OF THE INVENTION

It is an object of the present invention to provide a portable observation apparatus that is simple and convenient to convert from transport orientation into an operational orientation. It is a further object of the present invention to provide a portable observation apparatus that is compact and light in weight so that an individual may conveniently carry it through treed areas.

The invention provides, in one aspect, a portable elevated observation chair apparatus comprising a rope ladder releasably attached on each side of a top end thereof to laterally separated elevated support locations such that the attachments cause a top portion of the rope ladder to resist twisting away from a substantially forward facing direction. Each side of a bottom portion of the rope ladder is releasably attached to laterally separated bottom support locations such that the attachments cause the bottom portion of the rope ladder to resist twisting away from the substantially forward facing direction. A bottom end of the rope ladder is located forward of the top end thereof such that at least one rung of the rope ladder is forward of a next adjacent higher rung of the rope ladder. A flexible chair is attached at a top portion thereof to an upper chair rung located in proximity to the top end of the rope ladder and attached at a bottom portion thereof to a next adjacent lower chair rung located forward of the upper chair rung such that a seat is provided by the flexible chair between the upper and lower chair rungs.

The invention provides, in a second aspect, a method of providing a portable elevated chair. The method comprises releasably attaching each side of a top end of a rope ladder to laterally separated elevated support locations such that the attachments cause a top portion of the rope ladder to resist twisting away from a substantially forward facing direction; then extending a bottom end of the rope ladder in the forward direction such that at least one rung of the rope ladder is forward of a next adjacent higher rung of the rope ladder and releasably attaching each side of a bottom portion of the rope ladder to laterally separated bottom support locations such that the attachments cause the bottom portion of the rope ladder to resist twisting away from the substantially forward facing direction; then attaching a top portion of a flexible chair to an upper chair rung located in proximity to the top end of the rope ladder and attaching a bottom portion of the flexible seat to a next adjacent lower chair rung located forward of the upper chair rung such that a seat is provided by the flexible chair between the upper and lower chair rungs.

The user can set up the apparatus without any assistance. Rather than climbing trees or throwing ropes over branches a telescoping pole may be provided to facilitate wrapping tethers attached to the top end of the rope ladder around a tree or branch serving as the elevated support location. A hook on the free end of the tether can be provided to engage a mid-point of the tether, and can be configured to grab the tether when tension is applied.

Tensioners, such as the ratchet and strap type commonly available as load binders, can be attached to each side of the bottom end of the rope ladder, and secured to laterally separated trees or the like forming the bottom support locations forward of the top end. Tightening the tensioners will apply tension on the rope ladder and tethers at the top end thereof that will resist twisting of the rope ladder. A further tether can be added to each side of the middle of the rope ladder in order to further stabilize the apparatus.

Top and bottom rungs of the rope ladder can be extended somewhat longer than the other rungs. When the tether and tensioners are attached to these longer rungs, more leverage is applied to resist twisting of the rope ladder.

The tethers and tensioners are mounted and attached such that the rope ladder is oriented facing substantially in the forward facing direction, although depending on the trees or other supports available, some variation will occur which variation will not generally affect the operation of the apparatus.

The chair can be made from canvas or the like that will fold easily so that the apparatus can be converted from the upright hanging operational position into a rolled and compact transportation configuration that can be placed in a knapsack or simply tied in a bundle for carrying by the user.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is side view of a hook used to tether the apparatus to a tree or the like;

DETAILED DESCRIPTION OF ILLUSTRATED EMBODIMENTS

Figure 1:
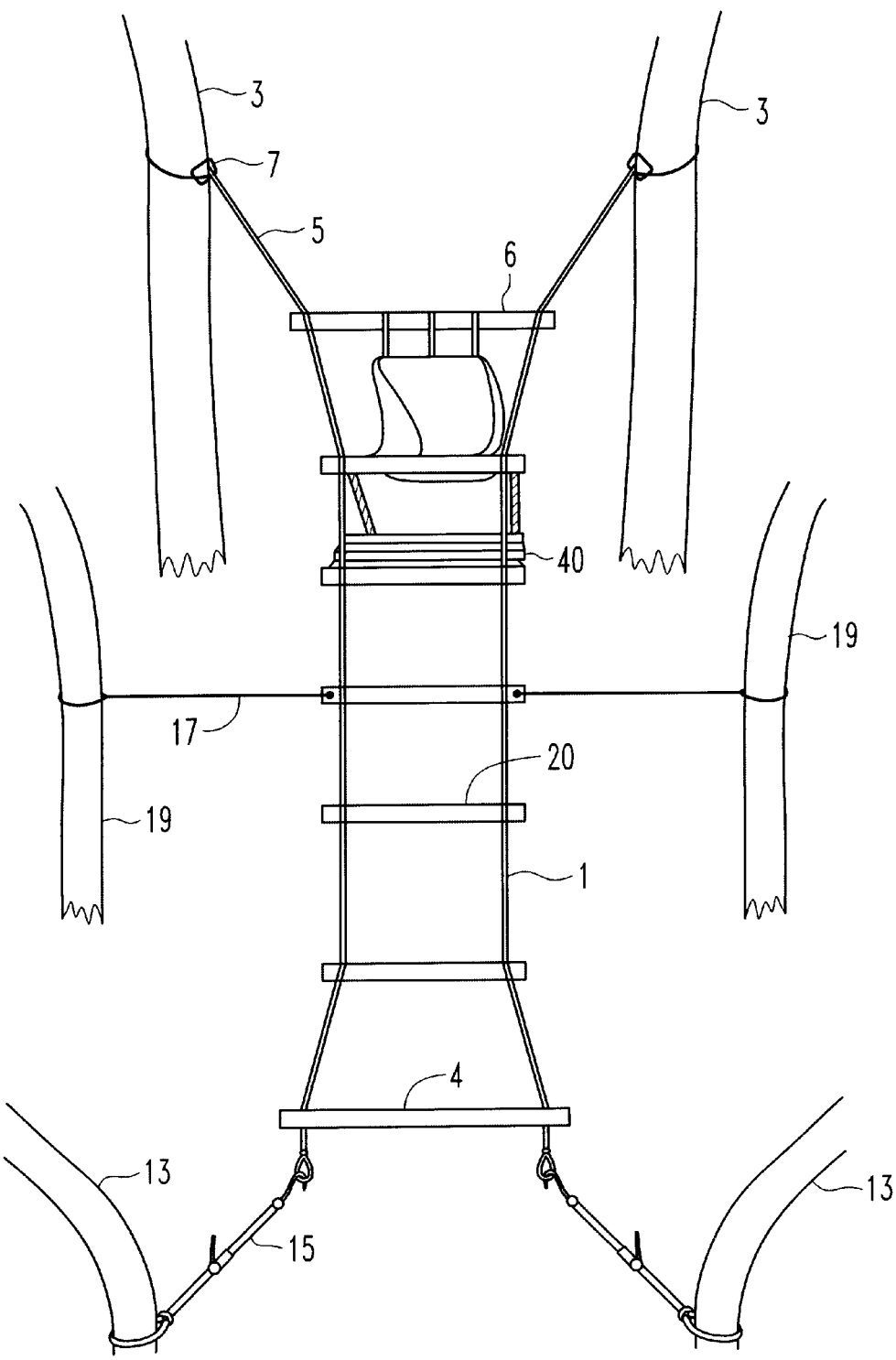
FIG. 1 is a front view of an embodiment of a portable elevated observation apparatus of the invention.
Figure 2:
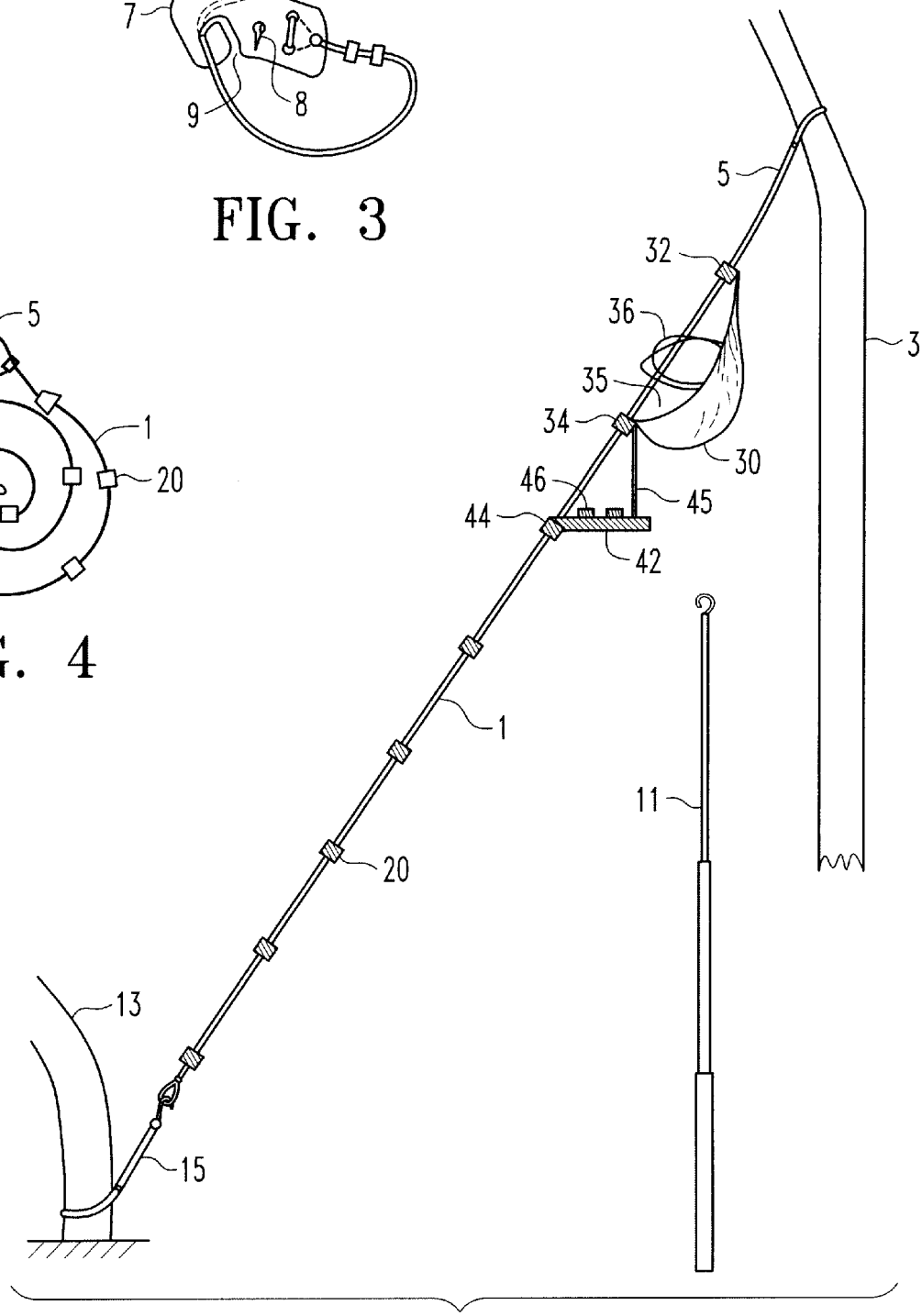
FIG. 2 is a side view of the embodiment of FIG. 1.

FIGS. 1 and 2 illustrate an embodiment of a portable elevated observation chair apparatus of the invention comprising a rope ladder 1. The rope ladder 1 can be made traditionally from rope and wooden rungs, or could be made from thin cable with rungs of aluminum, or other like materials that combine strength with a compact size and light weight so that the apparatus can be readily carried by the user.

The rope ladder 1 is releasably attached on each side of a top end thereof to trees 3 which serve as laterally separated elevated support locations. Although other attachments are contemplated, the illustrated attachment is by tethers 5, each having a hook 7 attached to a free end thereof. The free end is wrapped around the tree 3 and the hook 7 is hooked on a midpoint of the tether 5.

Figure 3:
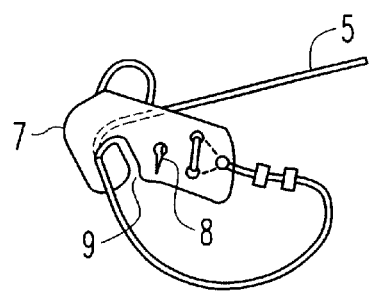

As illustrated in FIG. 3, the hook 7 includes a hook slot 9 that curves from the open end to the closed end to inhibit the hook from unintentionally releasing from the tether 5. The illustrated hook 7 also comprises a pin 8 adapted to penetrate a tree portion. While tension on the tether 5 will ordinarily maintain the tether in the tightened location on the tree 3, the pin 8 also will penetrate a tree trunk or limb and prevent slippage, especially where the tether 5 is wrapped around a vertical trunk, rather than a lateral branch. A telescoping pole 11 can be adapted at an upper end thereof to engage the hook 7 and allow placement of the hook 7 on the tether 5, and to allow moving the hook 7 out of engagement with the tether 5.

The attachment of each side of the top end of the rope ladder 1 to laterally spaced trees 3 causes a top portion of the rope ladder to resist twisting away from a forward facing direction, especially once tension is applied to the rope ladder 1 as described below. As can be seen in FIG. 1, the top rung 6, to which the tethers 5 are attached, is somewhat extended. This longer rung 6 causes more leverage to be exerted on the rope ladder 1 by the tethers 5 when the apparatus is tightened, thereby increasing the resistance to twisting.

The bottom end of the rope ladder 1 is located forward of the top end thereof, as seen in FIG. 2, and each side of the bottom of the rope ladder 1 is releasably attached to laterally separated trees 13 which serve as bottom support locations. Although again, other attachments are contemplated, the illustrated attachment is by adjustable tensioners, shown as a ratchet and strap load binder 15. The load binders 15 are tightened, thereby stabilizing the rope ladder 1 by placing each side of it under tension and causing it to resist twisting away from the forward facing direction along its entire length. Again as with the top rung 6, the bottom rung 4, to which the load binders 15 are attached, is somewhat extended to increase the resistance to twisting.

In FIG. 1 only, further ropes or the like 17 are illustrated attached to a middle portion of the rope ladder 1 and to laterally separated trees 19 which serve as middle support locations and further stabilize the middle portion of the rope ladder 1. The mid-point support is especially useful on longer rope ladders 1.

As seen in FIG. 2, each rung of the rope ladder is forward of a next adjacent higher rung of the rope ladder. A flexible chair 30, made from canvas or the like, is attached at a top portion thereof to an upper chair rung 32 located in proximity to the top end of the rope ladder 1 and attached at a bottom portion thereof to a next adjacent lower chair rung 34 located forward of the upper chair rung 32 such that a seat 35 is provided by the flexible chair 30 between the upper and lower chair rungs 32, 34. A seat belt 36 is also provided.

The illustrated embodiment includes a footrest 40. A pair of rigid footrest members 42 have a forward end thereof attached to a footrest rung 44 located below and next adjacent to the lower chair rung 34, and a rear end attached to the lower chair rung 34 by a cord 45 or the like such that the footrest members 42 are supported in a rearward extending direction. Cross members 46 are mounted on the footrest members 42.

Figure 4:
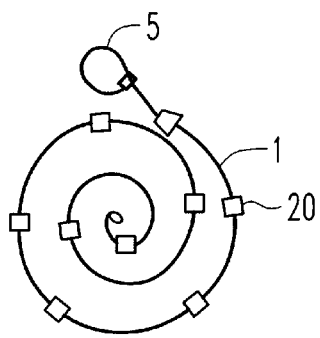
FIG. 4 is a schematic side view of the apparatus in a rolled up transport configuration.

FIG. 4 illustrates the apparatus rolled into a bundle which can be tied or carried in a knapsack. The bundle is light and compact and may be conveniently carried through treed areas until the user encounters a location where he desires to set the apparatus up. Often the user only needs to be located eight or ten feet above the ground in order to see over forest undergrowth. Hunters, photographers and the like calling in animals are often frustrated when the called animal comes well within range but is obscured or invisible because of such undergrowth. The apparatus of the invention will facilitate viewing such animals over the undergrowth, and increase the likelihood of successful observation. Unlike prior art elevated observation apparatuses, the present invention is readily transported through treed areas on the user's back The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A portable elevated observation chair apparatus comprising:
   a rope ladder releasably attached on each side of a top end thereof to laterally separated elevated top support locations such that the attachments cause a top portion of the rope ladder to resist twisting away from a substantially forward facing direction;
   wherein each side of a bottom portion of the rope ladder is releasably attached to laterally separated bottom support locations located vertically below and forward of the top support locations, such that the attachments cause tension on ropes of the rope ladder and cause the bottom portion of the rope ladder to resist twisting away from the substantially forward facing direction;
   wherein a bottom end of the rope ladder is located forward of the top end thereof such that each rung of the rope ladder is forward of a next adjacent higher rung of the rope ladder;
   a flexible chair attached at a top portion thereof to an upper chair rung located in proximity to the top end of the rope ladder and attached at a bottom portion thereof to a next adjacent lower chair rung located forward of the upper chair rung such that a seat is provided by the flexible chair between the upper and lower chair rungs under the rope ladder.

2. The apparatus of claim 1 wherein each side of a middle portion of the rope ladder is attached to laterally separated middle support locations such that the attachments cause the middle portion of the rope ladder to resist twisting away from the substantially forward facing direction.

3. The apparatus of claim 1 further comprising a footrest attached to the lower chair rung and to a footrest rung located below and next adjacent to the lower chair rung.

4. The apparatus of claim 3 wherein the footrest comprises a rigid footrest member having a forward end thereof attached to the footrest rung, and a rearward end attached to the lower chair rung such that the footrest member is supported in a rearward extending direction.

5. The apparatus of claim 1 wherein the bottom portion of the rope ladder is attached to the laterally separated bottom support locations by adjustable tensioners, and wherein the tensioners can be tightened to cause the bottom portion of the rope ladder to resist twisting away from the substantially forward facing direction.

6. The apparatus of claim 5 wherein the tensioners are attached in proximity to outer ends of a bottom rung of the rope ladder and wherein the bottom rung is longer than an adjacent rung above the bottom rung.

7. The apparatus of claim 1 wherein at least one support location is provided by a tree.

8. The apparatus of claim 1 wherein each side of the top end of the rope ladder is attached to laterally separated elevated support locations by a tether having a hook attached to a free end thereof, and wherein the free end is wrapped around an elevated support member and the hook is hooked on a midpoint of the tether.

9. The apparatus of claim 8 wherein the hook comprises a pin adapted to penetrate a tree portion.

10. The apparatus of claim 9 further comprising a telescoping pole adapted at an upper end thereof to engage the hook and allow placement of the hook on the tether.

11. A method of providing a portable elevated chair, the method comprising:

releasably attaching each side of a top end of a rope ladder to laterally separated elevated top support locations such that the attachments cause a top portion of the rope ladder to resist twisting away from a substantially forward facing direction;

extending a bottom end of the rope ladder in the forward direction such that each rung of the rope ladder is forward of a next adjacent higher rung of the rope ladder;

releasably attaching each side of a bottom portion of the rope ladder to laterally separated bottom support locations located vertically below and forward of the top support locations, such that the attachments cause tension on ropes of the rope ladder and such that the attachments cause the bottom portion of the rope ladder to resist twisting away from the substantially forward facing direction;

attaching a top portion of a flexible chair to an upper chair rung located in proximity to the top end of the rope ladder and attaching a bottom portion of the flexible seat to a next adjacent lower chair rung located forward of the upper chair rung such that a seat is provided by the flexible chair between the upper and lower chair rungs under the rope ladder.

12. The method of claim 11 further comprising releasably attaching each side of a middle portion of the rope ladder to laterally separated middle support locations such that the attachments cause the middle portion of the rope ladder to resist twisting away from the substantially forward facing direction.

13. The method of claim 11 further comprising providing a footrest attached to the lower chair rung and to a footrest rung located below and next adjacent to the lower chair rung.

14. The method of claim 13 wherein the footrest comprises a rigid footrest member having a forward end thereof attached to the footrest rung, and a rearward end attached to the lower chair rung such that the footrest member is supported in a rearward extending direction.

15. The method of claim 11 wherein the bottom portion of the rope ladder is attached to the laterally separated bottom support locations by adjustable tensioners, and wherein the tensioners are tightened to cause the bottom portion of the rope ladder to resist twisting away from the substantially forward facing direction.

16. The method of claim 11 wherein at least one support location is provided by a tree.

17. The method of claim 11 wherein each side of the top end of the rope ladder is attached to laterally separated elevated support locations by a tether having a hook attached to a free end thereof, and wherein the free end is wrapped around an elevated support member and the hook is hooked on a midpoint of the tether.

18. The method of claim 17 wherein the hook comprises a pin adapted to penetrate a tree portion.

19. The method of claim 18 wherein the tether is attached with a telescoping pole adapted at an upper end thereof to engage the hook and allow placement of the hook on the tether.

* * * * *